US007213436B2

United States Patent
Sturrus et al.

(10) Patent No.: US 7,213,436 B2
(45) Date of Patent: May 8, 2007

(54) STAMPING APPARATUS FOR FORMING ROD WITH CONFIGURED ENDS

(75) Inventors: Peter Sturrus, Grand Haven, MI (US); James A. Boos, Grand Haven, MI (US)

(73) Assignee: Shape Corporation, Grand Haven, MI (US)

( * ) Notice: Subject to any disclaimer, the term of this patent is extended or adjusted under 35 U.S.C. 154(b) by 43 days.

(21) Appl. No.: 11/132,696

(22) Filed: May 19, 2005

(65) Prior Publication Data

US 2005/0262916 A1    Dec. 1, 2005

Related U.S. Application Data

(60) Provisional application No. 60/575,285, filed on May 28, 2004.

(51) Int. Cl.
*B21D 22/02* (2006.01)

(52) U.S. Cl. .................. 72/377; 72/356; 29/898.052

(58) Field of Classification Search .............. 72/339, 72/356, 377, 404; 29/888.092, 896.5, 898.052
See application file for complete search history.

(56) References Cited

U.S. PATENT DOCUMENTS

| | | | |
|---|---|---|---|
| 1,470,119 A | 10/1923 | Schaefer |
| 1,656,930 A | 1/1928 | Whitney |
| 1,959,489 A | 5/1934 | Miller |
| 3,166,835 A | 1/1965 | Kolbe |
| 3,255,623 A | 6/1966 | Ricks |
| 3,314,137 A | 4/1967 | Schellens |
| 3,644,973 A | 2/1972 | Abe |
| 3,867,832 A | 2/1975 | Rut |
| 4,073,178 A | 2/1978 | Dutartre et al. |
| 4,306,342 A | 12/1981 | Hansen |
| 4,414,726 A | 11/1983 | Cale, Jr. |
| 4,450,703 A | 5/1984 | McCloskey |
| 4,598,457 A | 7/1986 | Kiwak et al. |
| 4,901,426 A | 2/1990 | Laue |
| 4,970,887 A | 11/1990 | Lorieux |
| 5,230,134 A | 7/1993 | Laue |
| 5,419,043 A | 5/1995 | Laue |
| 5,425,286 A | 6/1995 | Laue |
| 5,429,014 A | 7/1995 | Laue |
| 5,456,137 A | 10/1995 | Laue |
| 5,606,790 A | 3/1997 | Laue |
| 5,657,663 A | 8/1997 | Miyahara et al. |
| 5,881,608 A | 3/1999 | Laue |
| 6,109,164 A | 8/2000 | Okuhara et al. |
| 6,490,790 B1 | 12/2002 | Soga et al. |

*Primary Examiner*—Lowell A. Larson
*Assistant Examiner*—Debra Wolfe
(74) *Attorney, Agent, or Firm*—Price, Heneveld, Cooper, DeWitt & Litton LLP

(57) ABSTRACT

A method comprises steps of providing bar stock, cutting the stock to form a rod-shaped blank, and stamp-forming a ball section on a first end of the blank in a transfer die. The method further includes stamp-forming an apertured flattened section on a second end of the blank to form a final product in the transfer die, and axially striking opposing ends to accurately form a length of the blank. A related transfer die apparatus includes stations for cutting and then stamp-forming a ball section on a first end of the blank, and stamp-forming an apertured flattened section on a second end of the blank to form a final product.

26 Claims, 9 Drawing Sheets

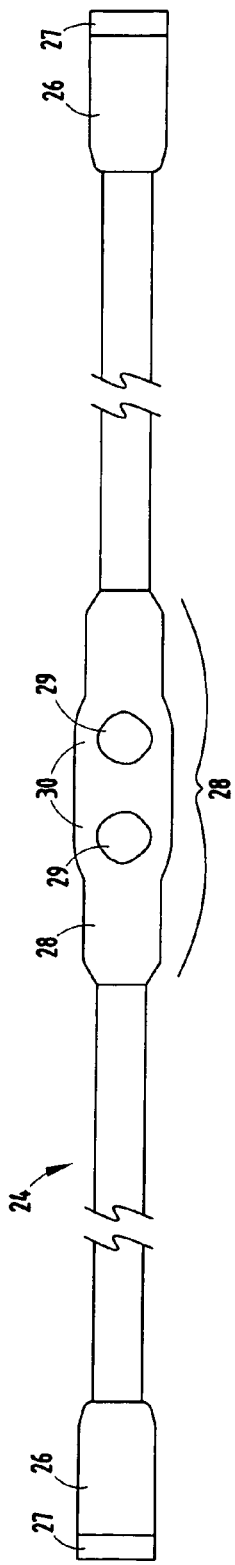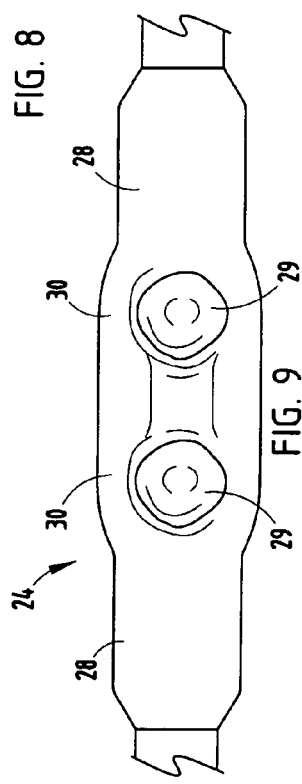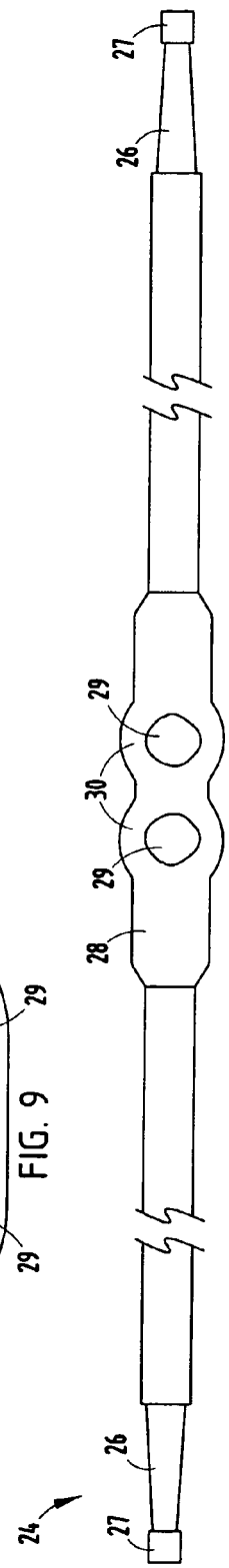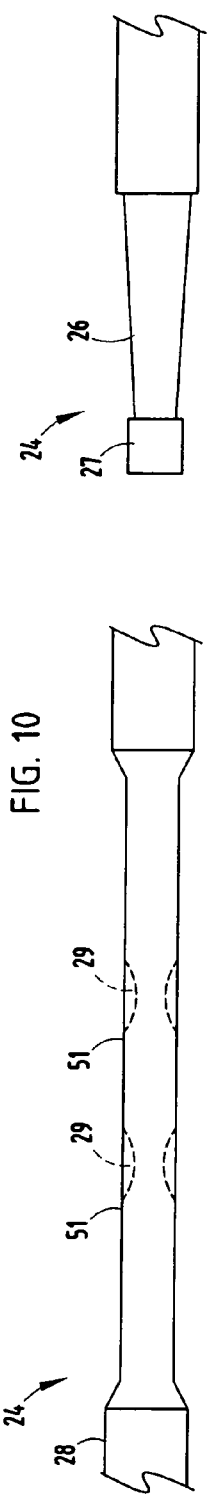

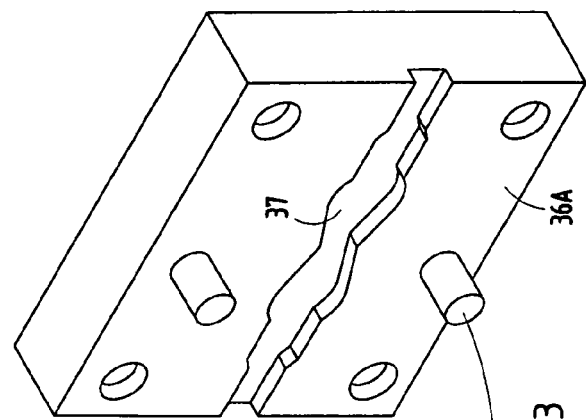
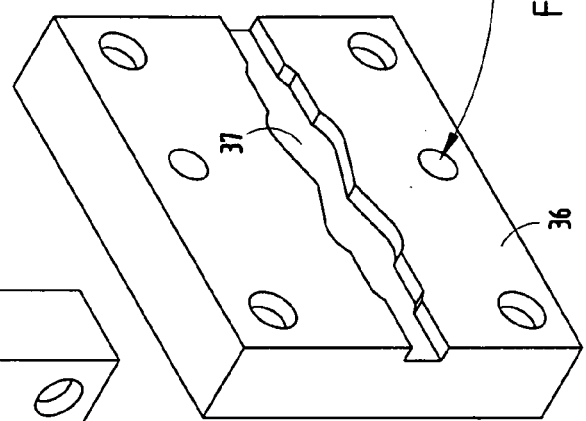
FIG. 13
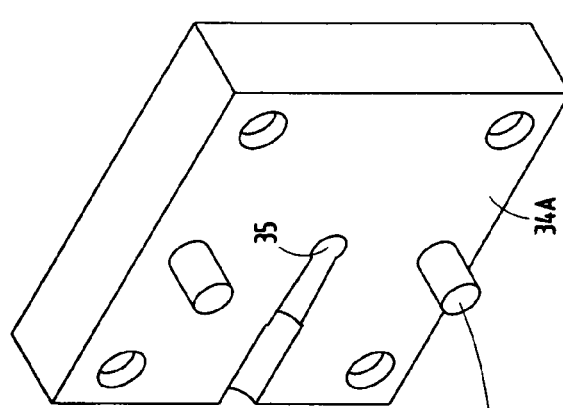
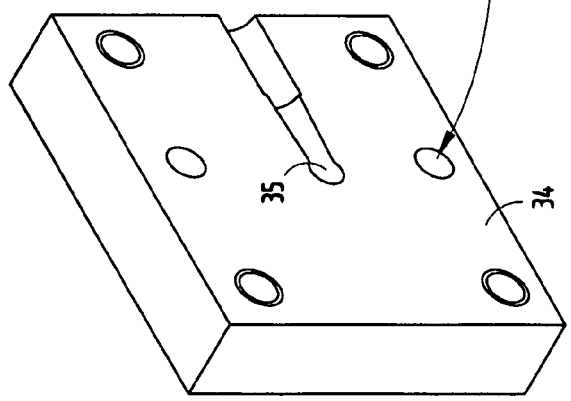
FIG. 12

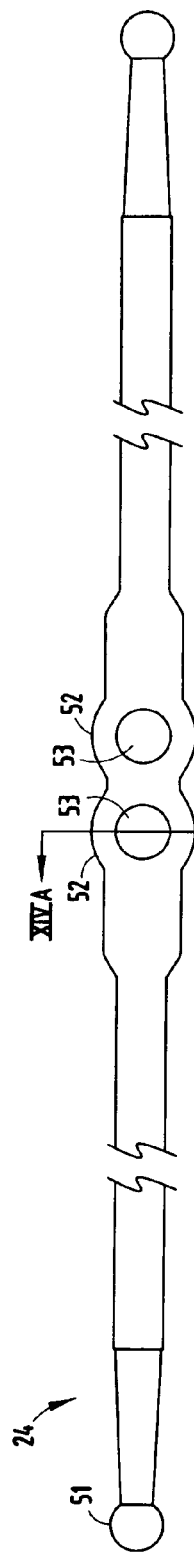
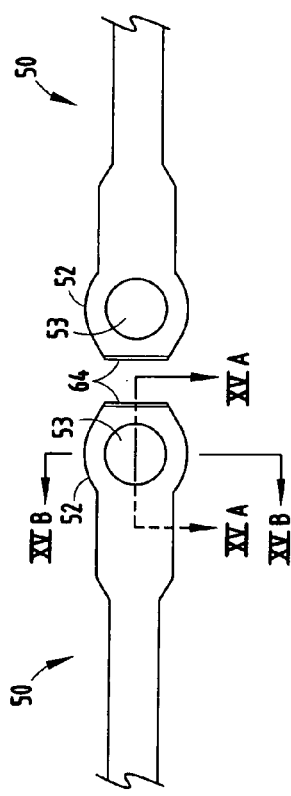
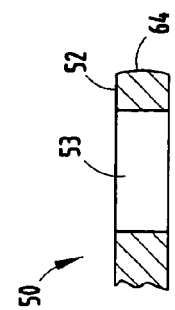
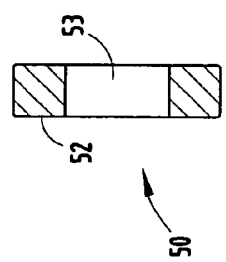
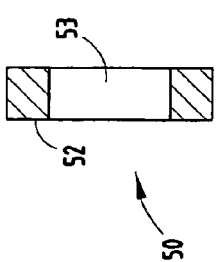

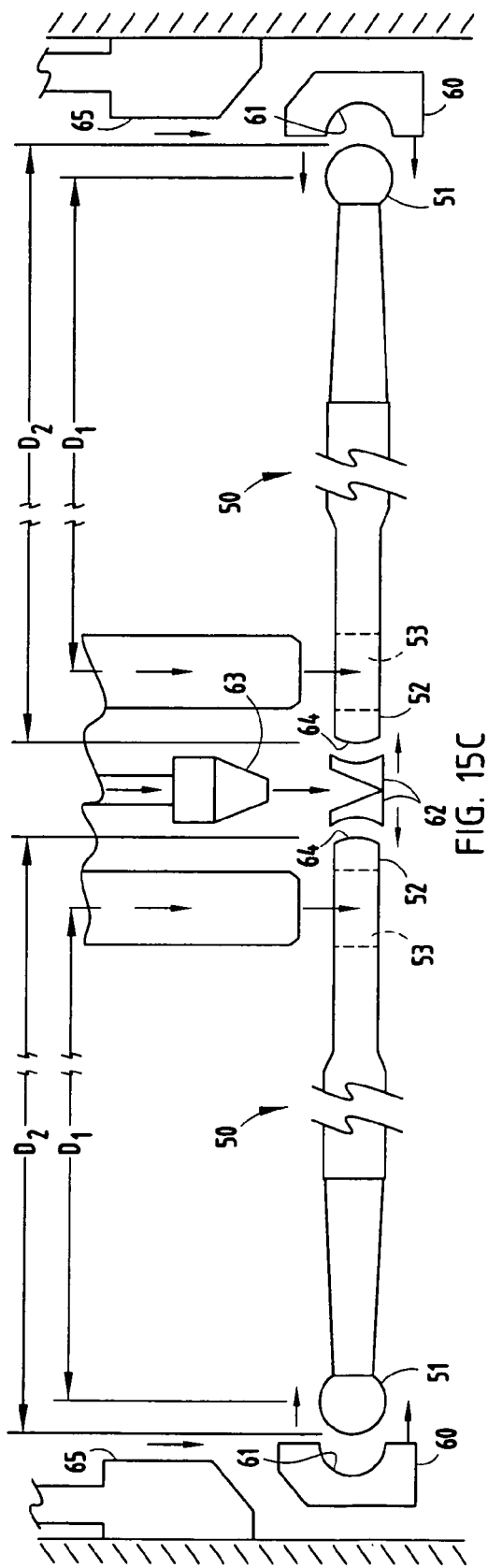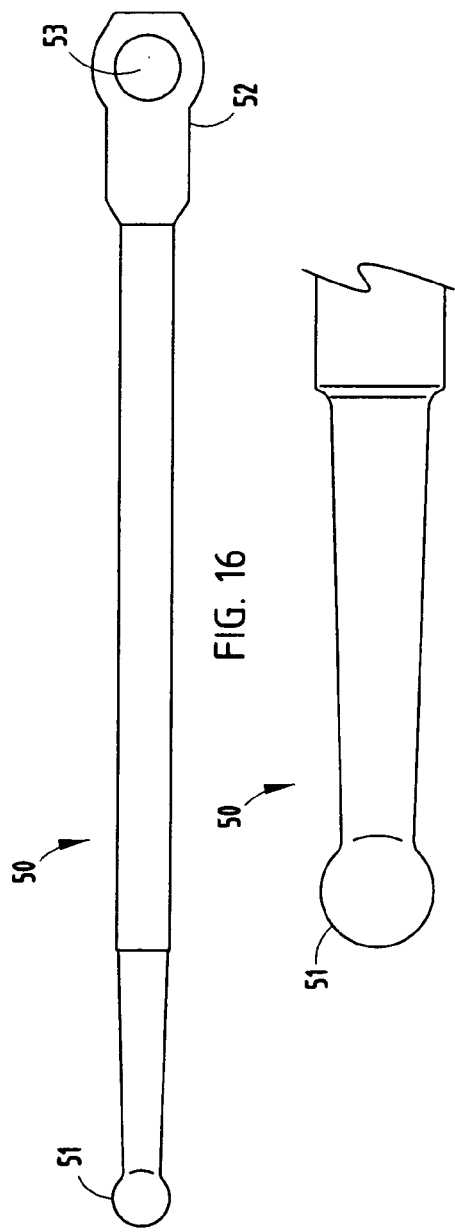

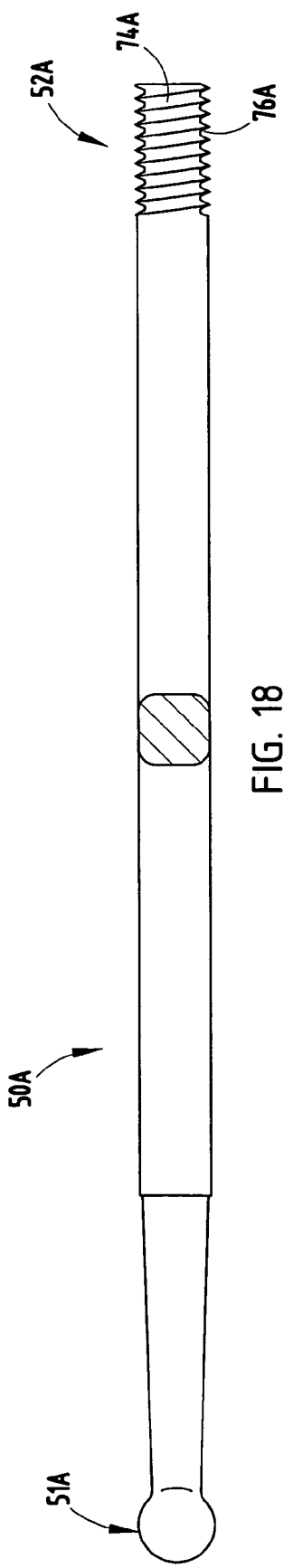
FIG. 18
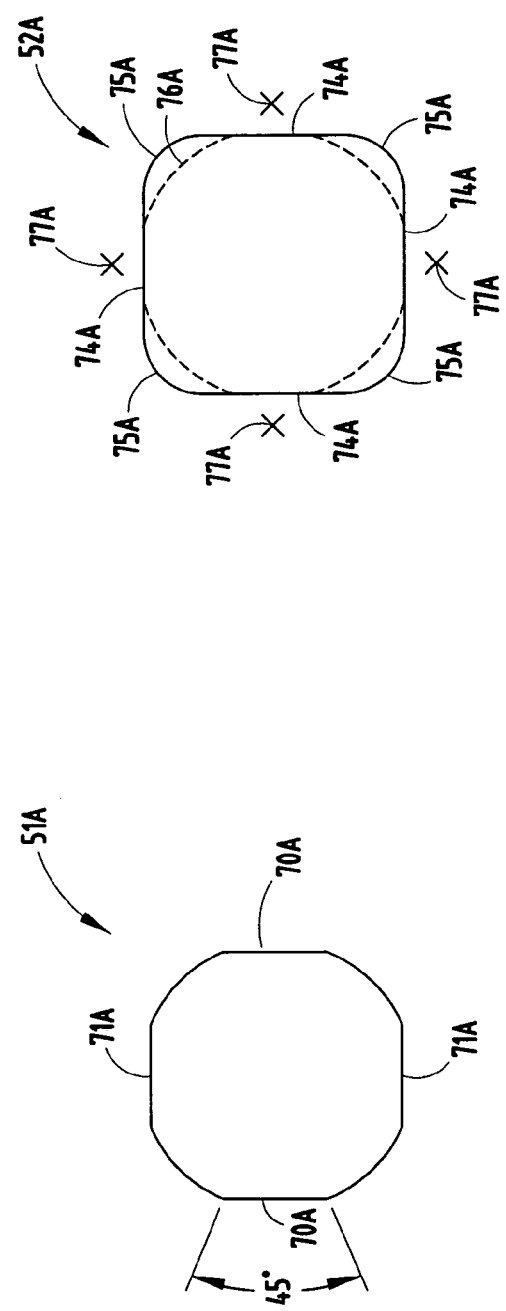
FIG. 20
FIG. 19

STAMPING APPARATUS FOR FORMING ROD WITH CONFIGURED ENDS

CROSS REFERENCE TO RELATED APPLICATION

This application claims benefit under 35 USC 119(e) of provisional application Ser. No. 60/575,285, filed May 28, 2004, entitled STAMPING APPARATUS FOR FORMING ROD WITH CONFIGURED ENDS, the entire contents of which are incorporated herein in their entirety.

BACKGROUND

The present invention relates to a stamping apparatus for forming a push rod with formed ends.

It is known to make elongated structural components such as a brake push rod by taking a long rod, machining one end to form a ball, and forging an opposite end to form a flattened area which is subsequently drilled, machined, and/or otherwise finished to form a precision hole. However, machining and forging operations are expensive since they require set-up time and require the use of expensive capital equipment. Further, they may result in substantial "in-process" inventory. It is desirable to manufacture these components from less expensive processes and more easily automated processes. More broadly, it is desirable to form accurate ball sections, ring sections, and/or threaded sections by stamping processes rather than having to utilize machining operations.

Accordingly, an apparatus solving the aforementioned problems and having the aforementioned advantages is desired.

SUMMARY OF THE PRESENT INVENTION

In one aspect of the present invention, a method comprises steps of cutting stock to form a rod-shaped blank, and then stamp-forming a ball section on a first end of the blank and stamp-forming an apertured flattened section on a second end of the blank to form a final product.

In a narrower form, ends of the blank are axially engaged to accurately form a length dimension of the blank between the ball section and the apertured flattened section.

In another narrower form, the step of stamp-forming the ball section includes stamping the first end along a first direction to form a rough ball section, rotating the blank on the longitudinal centerline 90 degrees, and stamp-forming the rough ball section along the first direction to form a final ball section having a net shape with desired radius.

In yet another narrower form, the step of stamp-forming the ball section includes engaging the first end vertically to form a rough ball section, and then engaging the rough ball section horizontally using cams and slide members to form the final product with the ball section being a net radius shape.

In still another narrower form, the step of cutting stock includes forming each blank to include a length sufficient to manufacture two of the final products.

In another aspect of the present invention, an apparatus includes at least first, second and third die stations. The first die station is adapted to stamp-form a rough flattened section on a rod-shaped blank, including forming a center depression having a shallower dimension than the ring of material around the center depression. The second die station is adapted to stamp-form the rough flattened section to become a reformed flattened section having a well-defined ring of material around the center depression. The third die station is adapted to stamp a hole through the center depression while leaving the ring of material in place.

In another aspect of the present invention, a method includes steps of providing an elongated blank having a square cross section with four corners, and stamping threads onto the four corners at at least one end thereof.

These and other aspects, objects, and features of the present invention will be understood and appreciated by those skilled in the art upon studying the following specification, claims, and appended drawings.

BRIEF DESCRIPTION OF DRAWINGS

FIG. 8 is a top view of the blank after a first stamp-forming operation on the flattened section (i.e., center area) of the blank in station #3.

FIG. 9 is a top view of a second stamp-forming operation on the flattened section of the blank, including formation of a deep recess with a "bullet" punch. Notably, the operations shown in FIGS. 8 and 9 can be separate, or they can be combined into a single station.

FIG. 10 is a perspective view of the double-length blank after the stamp-forming operations of FIGS. 6–9 in station #4; FIG. 10A being an enlarged side view of a center area showing the flattened sections on the blank and FIG. 11 being an enlarged side view of the "ball" end of FIG. 10.

FIG. 12 is a perspective view of a die part for forming the ball end of the component in station #5, and FIG. 13 is a perspective view of a die part for forming the apertured end of the component in station #5. The tooling of stations #6 and #7 are similar but form the blank closer and closer to a net final shape.

FIG. 14 is a plan view of the double-length blank as formed after being struck by the dies in FIGS. 12–13 and in stations #5–#7; and FIG. 14A is a cross section through the flattened section.

FIG. 15 a view of the blank of FIG. 14 after being divided into two separate components, and FIGS. 15A and 15B are cross sections taken along the lines XVA—XVA and XVB—XVB.

FIG. 15C is a side view of the final forming station, and includes center die parts including cams and slides for forming arcuate ends on the apertured flattened sections and includes cams and slides on each end for forming the ball sections on the opposite ends of the push rods, . . . and for forming an accurate length dimension between the ball section and apertured flattened sections.

FIGS. 16–17 are plan views of the finished component, FIG. 17 being an enlarged view of the ball end of FIG. 16.

FIG. 18 is a side view of a modified formed component including a ball end and a threaded end.

FIGS. 19 and 20 are end views of the ball end and the threaded end.

DESCRIPTION OF PRIOR ART

Figure 1:
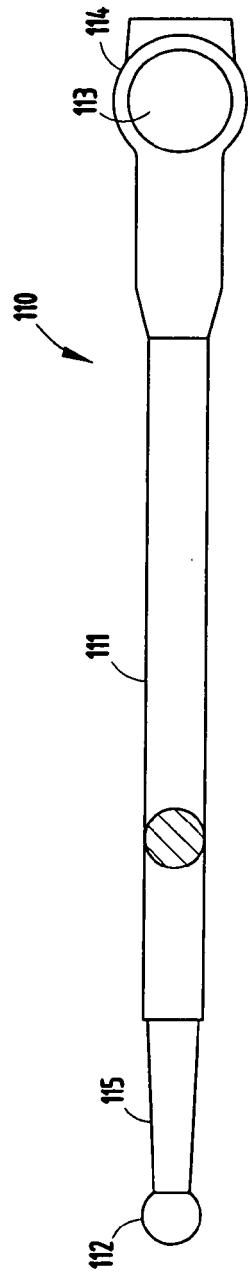
FIGS. 1–3 show a prior art article.
Figure 3:
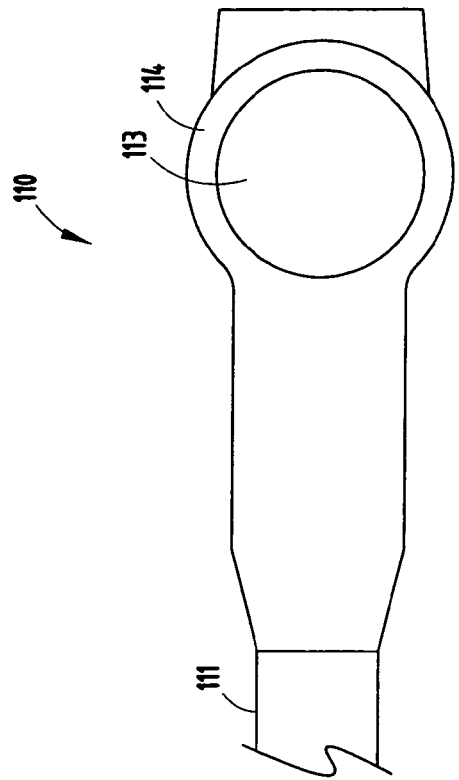
Figure 2:
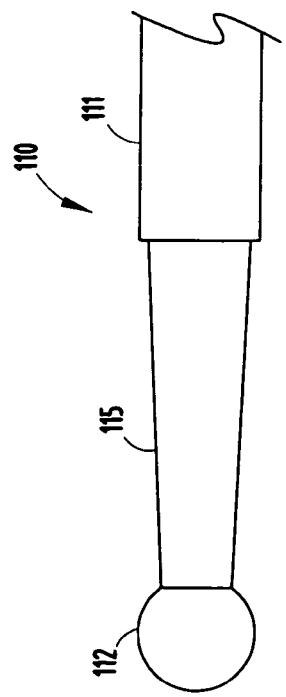

A prior art brake push rod 110 (FIGS. 1–3) includes a long rod 111, a tapered end section 115 supporting a ball section 112 at one end, and a forged flattened section 114 with a hole 113. The ball section 112 and hole 113 are machined for close control of dimensions and tolerances, and the flattened section 114 is forged for strength.

DETAILED DESCRIPTION OF PREFERRED EMBODIMENTS

Figure 4:
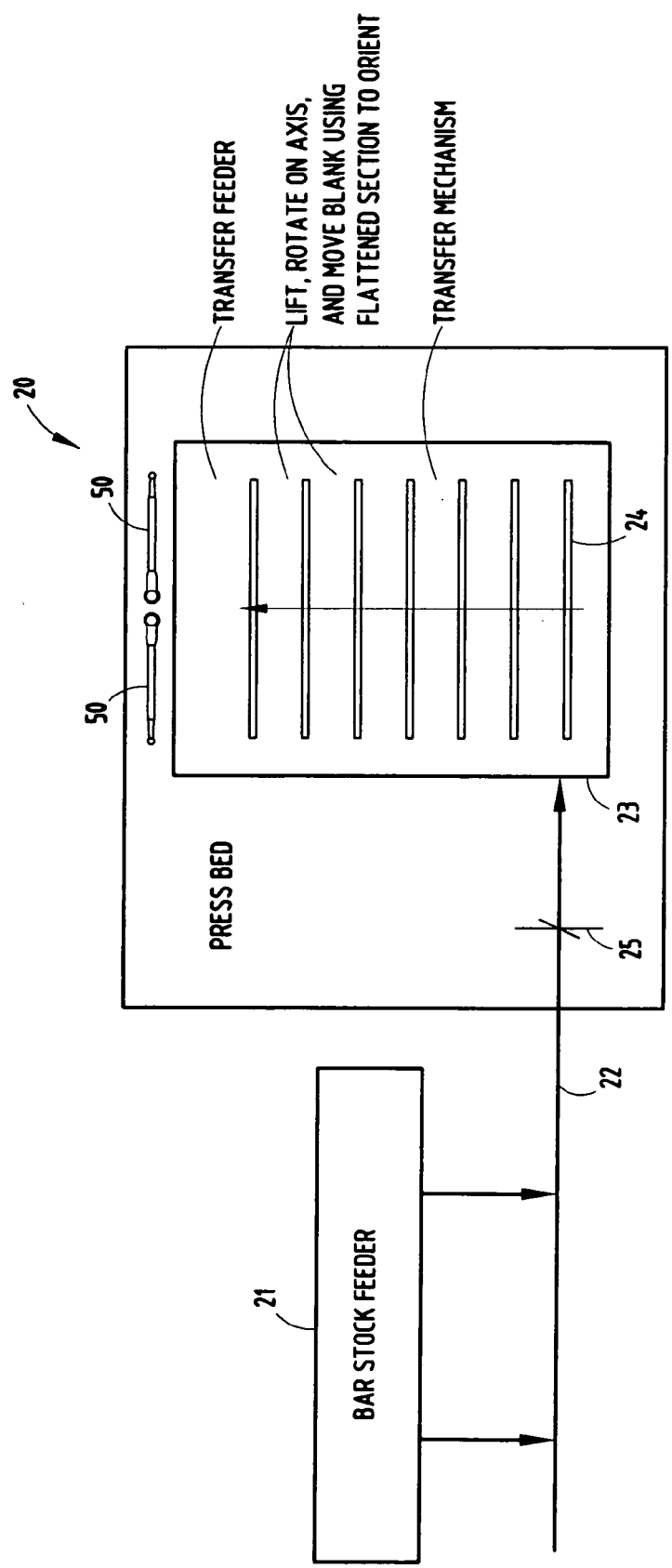
FIG. 4 is a schematic plan view of a bar stock feeder and transfer die.

An apparatus 20 (FIG. 4) is provided for stamp-forming configured ends on a blank 24 cut from bar stock into a length about equal to a pair of push rods 50 positioned end to end. Once formed, each push rod 50 (FIG. 16) has a ball section 51 of precise diameter on one end and an apertured flattened section 52 with a hole 53 of precise diameter on its other end, the hole 53 and ball section 51 being a precise dimension apart. Notably, the push rods 50 can be made to be any length desired. Further, it is contemplated that the dies can be made adjustable to make push rods 50 of different lengths. Though the illustrated product is a push rod, it is contemplated that the present invention also includes making other parts, such as a shaft with a ball end for forming a universal ball-and-socket joint.

The apparatus 20 (FIG. 4) includes a series of stations in a transfer die for stamping the ball section 51, including a ball-forming station adapted to rough-form a ball on the blank, a mechanism for rotating the blank 90 degrees on its centerline, and a re-strike station improving a net final shape of the ball section 51. Alternatively, the ball-forming station may instead include a cam-forming station for striking the ball section 51 from a perpendicular direction (i.e., the striking direction being parallel and in-line with the transfer direction) to better form the net final shape of the ball section, as discussed below. By careful control over flow of the material, micro cracks and stress fractures can be avoided.

The apparatus 20 also includes additional stations that stamp an end of the blank to move material laterally away from the centerline (so that material is available for forming outer portions of the ring of material around the hole). Testing has shown that by containing and controlling the flow of material in these stations, a well-defined ring of material can be formed for later use in making a structurally strong and dimensionally consistent apertured flattened section 52. Additional stations are provided to stamp the end to more accurately make the flattened section 52 and the hole 53, and then at least one re-strike station and shaving station are provided to give the hole 53 and flattened section 52 an accurate net shape. Also, an operation is added to shave an end of the flattened section 52, if desired. Further, in a last station, the entire part is struck axially on its ends to provide an arcuate (curved) end shape and an accurate length dimension. By this method, the end surface of the apertured flattened section 52 is struck and given a very specific radius, as discussed below. By this arrangement, the dimensions of the ball section 51 and the hole 53 in the flattened section 52 as well as the outer shape of the flattened section 52 itself are closely controlled to be consistent and suitable for their intended purpose. Further, the structural integrity and strength of the part is maintained throughout a length of the part for durability and dependable strength and function, and the length dimension is accurately and consistently controlled. Testing has shown that by careful control over the material flow, micro-cracks and stress fractures can be avoided.

Notably, the present preferred process is a transfer die. However, it is contemplated that the present invention includes other processes and die arrangements. For example, for low volume jobs, transfer of in-process parts can be done manually instead of automatically by transfer mechanisms in the die. Also, the present apparatus focuses on making a pair of parts positioned end to end (so that forces from the forming operations are opposing and balanced) . . . but the present inventive concepts also cover manufacture of a single part made one at a time.

A layout of the present apparatus 20 (FIG. 4) can be varied, but in a preferred form includes a bar stock feeder 21 adapted to feed bar stock 22 laterally into a transfer die 23. The transfer die 23 includes a material transfer mechanism for feeding the double-length blanks 24 to the various stations. Such transfer mechanisms are generally known in the art and need not be described for an understanding of the present invention. The bar stock 22 is cut into lengths forming a double-length blank 24 by a cutter 25 in station #1 on the transfer die (or ahead of the transfer die). The blank 24 has a square cross section (FIG. 5), although other shapes could be used if desired as long as there is sufficient material for forming the enlarged parts of the finished product. The illustrated blank 24 is sufficiently long to form a pair of the final push rods 50, as will become apparent from the discussion below. This is preferred since it allows the transfer die to be designed with "balanced loading", since the same operation is performed simultaneously at each end of the blank 24.

The virgin stock for making the blanks 24 is linear bar stock of suitable ductile material that can be deformably displaced under typical press pressures applied by stamping presses used in mass production. Preferably, the stock will have a square cross section, since this provides a uniform cross section of material with perpendicularly oriented side surfaces. The flat opposing surfaces assist in uniformity of displaced material when forming the enlarged flattened section 52, since it is relatively easy to stably engage the flat surfaces and to move equal amounts of material from a square cross section outwardly. Contrastingly, bar stock having a round cross section is more difficult to form, since the arcuate surface of a round cross section potentially makes it more difficult to strike the part perfectly in a center location so that equal amounts of material are moved outwardly. Also, in rods having a round cross section, the material must be moved a greater distance. Thus, the flat-sided shape of the square blank 24 is considered to be an inventive part of the present invention.

It is contemplated that the blank 24 could be originally provided in the form of a roll of stock material that is unrolled and then passed through a straightener prior to cutting the blanks to length. Still another contemplated alternative is to provide sheet steel having a thickness of the blank 24 and a width equal to a length of the double-length blank. In this version, rod-shaped blanks 24 would be shearingly stamped or cut from an edge of the sheet. The "edge-trimmed" blanks 24 will work well as long as the process is carefully controlled to have sufficient material for forming the various enlarged/formed portions of the push rod 50. However, it is noted that "edge-trimmed" blanks made from shearing edges of a sheet will tend to have a cross section that is slightly distorted (e.g., slightly rhomboid in shape rather than having a square cross section) . . . thus making it more difficult for automatic transfer mechanisms in a transfer die and potentially making it more difficult to make a consistent and dimensionally accurate final part.

Figures 5, 6, 6A, 7:
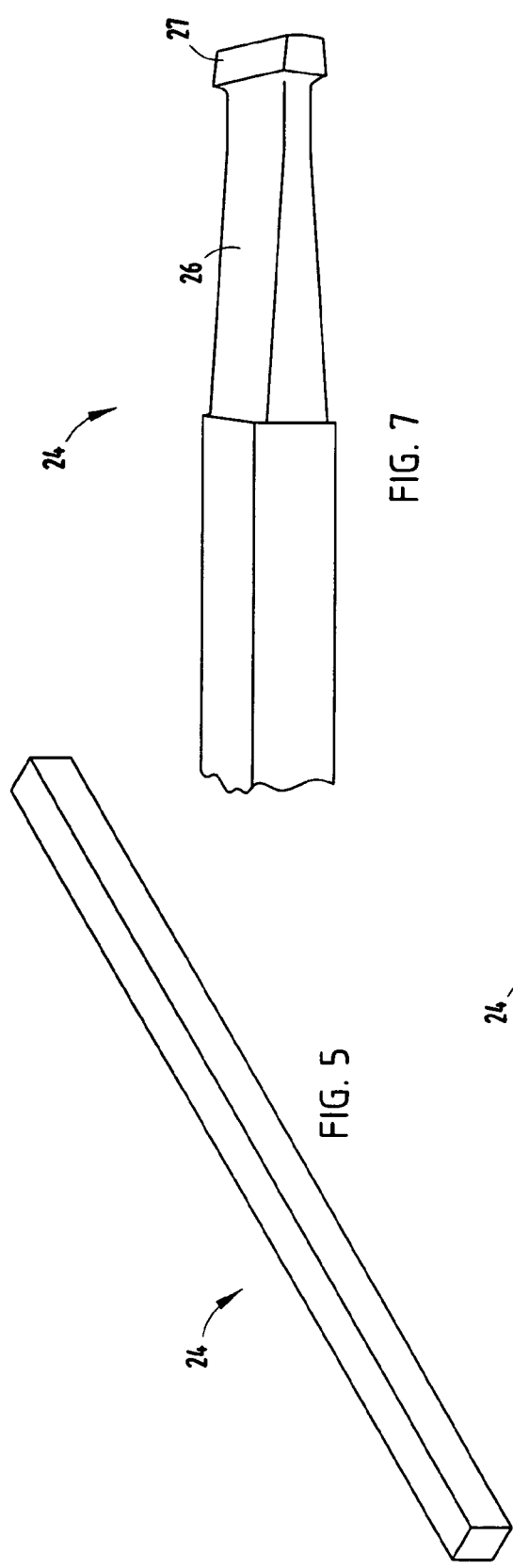
FIG. 5 is a perspective view showing a bar stock cut to length to form a double-length blank in a station #1 in the transfer die apparatus of the present invention.
FIGS. 6, 6A, and 7 are top, side, and perspective views of the components after a first stamp-forming operation on the "ball" end of the blank in station #2.

In the illustrated process, a first configured end of the blank 24 is formed by coining the end in a first forming operation in station #2 (FIGS. 6–7) to have a wedge-shaped tapered section 26 leading down to a narrow throat leading immediately to an enlarged rectangular knob 27 at the end of the blank 24. The narrow throat is thin when viewed from a side, but has a widened dimension in the coined area when viewed from above. FIG. 7 shows an enlarged perspective view of one of the coined ends.

The blank 24 (FIG. 8) is then formed in its middle area (in the area which will end up being the configured second end of the part 50) in a second forming station #3. Basically, the intention of station #3 is to move equal amounts of material in a contained and controlled manner laterally in an outward direction so that sufficient material will be available for making an outer portion of the ring of material in the flattened sections 52 around the holes 53. This is done by pressing the middle section 28 of the blank against a hardened cylinder, causing the middle section 28 to flow outward. The flatness of the top surface of the blank 24 assists in accurately flowing equal amounts of material in the outward direction. This results in forming a shallow elongated center depression 29 with a thicker ring 30 of material around the depression 29. Alternatively, the material in the flattened sections 52 can be moved outwardly by using a "bullet punch" instead of a cylinder. FIG. 9 shows the ring 30 after the bullet punch moves material out of the area of depression 29 and toward the ring 30, the result being that the hole (53) is partially formed. Notably, one or both of the steps shown in FIGS. 8 and 9 can be used. The shape of the raw blank 24 after additional forming at station #4 is shown in FIG. 10. Notably, the outer shape of the ring 30 of material is fairly well-formed at this point, and includes relatively accurately formed edges of the top and bottom surfaces.

A shape of the ball end of the raw stock before the hit on station #5 is shown in FIG. 11. The tooling die for forming the ball end is shown in FIG. 12 and the tooling die for forming the flat end is shown in FIG. 13. The tooling of FIG. 12 includes opposing die halves 34 and 34A each having a recess 35 generally shaped like the ball end 51 of the final push rod 50. The tooling of FIG. 13 further includes die halves 36 and 36A having a recess 37 generally shaped like the apertured flattened section 52. It is contemplated that only a couple die halves will be needed to fully form each end of the blank 24, but it is contemplated that as many die halves can be provided as are necessary for the accuracy desired. FIG. 14 shows the blank 24 after being formed on the tooling of FIGS. 12–13.

The illustrated transfer die apparatus 20 includes a series of stations for stamping the ball section 51, including a first ball-forming station adapted to rough-form a ball on the blank, a mechanism (part of the transfer mechanism) for rotating the blank a rotational distance of 90 degrees on its centerline (see FIG. 4), and a re-strike station improving a net shape of the ball section 51. It is contemplated that the forming stations in the illustrated transfer die can be as close as 3 inches apart or possibly slightly closer where the transfer mechanism includes a flipping device for rotating the blank 24 rotationally 90 degrees about its centerline. Part of the closeness of adjacent stations is due to the fact that cams and sliding die parts do not need to be located between stations. Notably, the step of rotating the blank 24 through a 90 degree rotation also helps to accurately form the tapered section leading up to the ball section 51, since the direction of impact for the tooling is direct (i.e., vertical) . . . and does not need to be done through slide and angled drive mechanisms (which would make tooling much more complicated and expensive). The location at which the blank 24 is rotated 90 degrees is preferably after the apertured flattened section 52 is fully formed, so that all of the die-forming actions are from vertical die strikes.

However, it is contemplated that the device for rotating the blank 90 degrees on its centerline can be eliminated, and instead, slides and cams can be used to provide a strike directed horizontally against the ball section 51 at 90 degrees from vertical. Such slides and cams in dies are generally known in the art, and a detailed description is not required herein for an understanding of the present invention by a person of ordinary skill. It should be understood that if cams and slides are used, room will need to be provided between the stations of the transfer die apparatus 20. It is contemplated that this distance between each station would be about 6 inches (as compared to the 3 inches for the system without slides and cams noted above).

Notably, the tooling of FIG. 12 includes die components for axially-directed end-forming of the blank to further improve a shape of the ball section 51 and flattened section 52, and to assure a very accurate length dimension between the sections 51 and 52. Specifically, the illustrated end-forming tooling die part 60 includes a dish-shaped recess 61 that is adapted to axially engage an end of the parts 50, after the formed blank 24 is sheared into two separate rods 50. Simultaneously, a pair of center die parts 62 are positioned between the adjacent apertured flattened sections 52. In the last station, a cam 63 forces the die parts 62 apart and toward the flattened sections 52, forming a radiused surface 64 on the end of the flattened sections 52. A second cam 65 engages the end-forming tooling die part 60, forcing the die part 60 against the ball section 51 to give it a final accurate net shape and accurate length.

The completed stamped part 50 is shown in FIG. 16, and an enlarged view of the ball end is shown in FIG. 17. Notably, the throat leading up to the ball section is a diameter smaller than the ball section, permitting the ball section 51 of the push rod 50 to be snap-attached to a mating component and permitting some rotation in the joint thereby formed. A remainder of the length of the push rod 50 can be left as a rectangular shaft 54. It is contemplated that if a rod shaft is desired, a different bar stock for the blank will be used.

The apparatus 20 also includes several stations that first stamp the blank to move material laterally away from the centerline so that material is available for outer portions of the ring of material around the hole. The material is moved as required without "over-stressing" the material in a manner that minimizes undesired shearing, fracturing, and material tearing. This also allows a minimum diameter stock to be used for the blank 24, thus reducing raw material costs and waste. Re-strike dies are used as needed to give the hole 53 and flattened section 52 an accurate net shape. By this arrangement, the dimensions of the ball section 51 and the hole 53 in the flattened section 52 as well as the flattened section 52 itself are closely controlled to be consistent and suitable for their intended purpose. Further, the structural integrity and strength of the part is maintained completely throughout a length of the part for durability and dependable strength and function.

Parts made by the present process and apparatus are substantially lower in cost (such as 30% or more lower) than previous forged/machined push-rod parts where machining and finishing operations are required. Initial testing has shown that a strength of parts 50 can be improved over prior art parts that were tested. Also, material handling and in-process inventory is reduced. Thus, the method and apparatus are believed to be non-obvious and hence inventive over known prior art.

FIGS. 18–20 show a modified stamp-formed component 50A including a ball end 51A and an oppositely-positioned threaded end 52A. For example, a ring-forming component can include a threaded socket adapted to threadably engage the threaded end 52A in order to assemble a component (50) having a ball end and a ring end (see FIG. 16). In component 50A, all identical and similar parts, features and characteristics are identified using the same identification numbers, but with the addition of the letter "A". This is done to reduce redundant discussion.

Component 50A (FIG. 18) is formed using a stamping process with transfer die similar to that previously disclosed. However, in component 50A, the blanks (24) are preferably made from rod stock (e.g. hot rolled bar stock of 1008 steel or 1010 steel) having a square cross section and cut to a length equal to about two of the components 50A positioned end to end. In component 50A, the ball end 51A is formed similarly to that disclosed above. However, we have found that it is advantageous to include opposing flat surfaces 70A (FIG. 19) on sides of the material forming the spherical surface 71A of the ball end 51A. By limiting the flat surfaces to about 45 degrees of surface area (see FIG. 19), the remainder of the ball section (i.e., the spherical surface 71A) forms a sufficiently large spherical surface to provide the bearing properties needed for the ball end 51A of the component 50A.

The flat surfaces are important for several reasons. One reason is because the flat surfaces 70A provide a cavity (i.e., an area within the sphere defined by the surface 71A) optimally located for material to "overflow" into as the remaining material is coined and formed. This allows the spherical surface 71A to have a very accurate spherical shape, with any material excess (or deficit) flowing into (or not flowing into) the cavities. Without the cavities formed by the flats, then the volume of material at the ball end 51A would have to perfectly match the spherical volume of the ball end 51A. From a practical standpoint, this "perfectly matched" volumetric condition is difficult to achieve. Further, it substantially increases manufacturing costs as a manufacturer attempts to control material flow to such an exact amount and direction. More specifically, to the extent that the material at the ball end ends up being "too much" for forming the desired spherical shape, the material would have no place to flow and would be trapped . . . resulting in poor formation of the ball since the steel material in basically incompressible and would force the tool apart, . . . and/or also would result in high stress to the material and to the tool since "fluidized" steel moving under compressive loading can generate tremendous loads. To the extend that the material at the ball end ends up being "too little" for forming the desired spherical shape, the spherical surface 71A would not be properly formed since if there isn't enough steel material to cause the outermost material to form a spherical surface 71A, the spherical shape ends up non-spherical and/or has surface voids and defects. (In other words, there would be irregular cavities and deformations in the spherical surface 71A since nothing would push the material outward into the spherical shape defined by the forming tool.) As noted above, it is difficult to achieve a perfect amount of material to "fill" the spherical shape at an end of the component 50A. Another important reason for the flat surfaces 70A is that, by coining/engaging the ball section at the flat surfaces 70A, the remaining material is forced to move and more accurately form the spherical surface 71A. Thus, the existence of the flat surfaces 70A gives an additional way to help accurately form the spherical surfaces 71A into a final very-accurate net shape. For all of the above reasons, the existence of the cavities present adjacent the flat surfaces offers tremendous advantages in forming the spherical surface 71A.

FIG. 19 is an end view of the ball section 51A as formed on an end of a rod blank, the ball section including opposing flat areas 70A that extend about 45 degrees around the ball on each side of the ball section. Notably, it is contemplated that the flat surfaces 70A can be made smaller if desired, or can be made slightly concave or convex. Also, the illustrated flat surfaces 70A are circular, but it is contemplated that they could have different geometries, such as if it was important to have a maximum bearing surface in a particular direction but less important to have a fully-formed spherical bearing surface in another direction.

FIG. 20 shows an end view of the threaded end 52A. As apparent, the cross section is generally square, with four flat sides 74A connected by generously radiused corners 75A. Threads 76A are formed on each of the corners 75A and extend only partially onto the flat sides 74A. The threads 76A extend sufficiently around the threaded end 52A to provide the retention strength and integrity desired of the threads. At the same time, the gaps 77A between the threads 76A at the flat sides 74A allow material flow. As noted above in regard to the spherical end 51A, the flow of material in the blank (24) is difficult to control. By providing the gaps 77A, the material has an "overflow" area to flow into if necessary (such as if "too much" material is located at the threaded end at the time of stamp-forming the threads). This leads to a greatly improved net shape with accurate thread formations and spaces therebetween. It also leads to longer tool life, and lower overall stress and wear on tooling, which can be critical when forming such detailed sections as threads. Testing has shown that the present threaded arrangement is surprisingly and unexpectedly strong, and is certainly sufficient for the contemplated use of push-rod component 50A.

Figure 22:
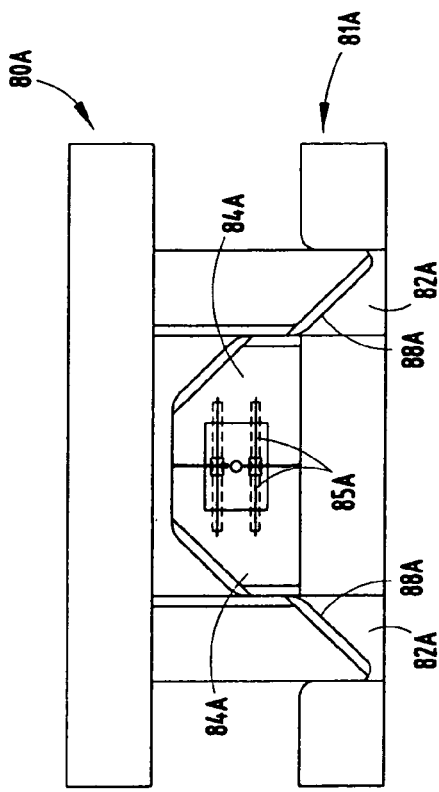
FIGS. 21–22 are schematic side views of a die station for forming threads on an end of a rod blank opposite a ball section.
Figure 21:
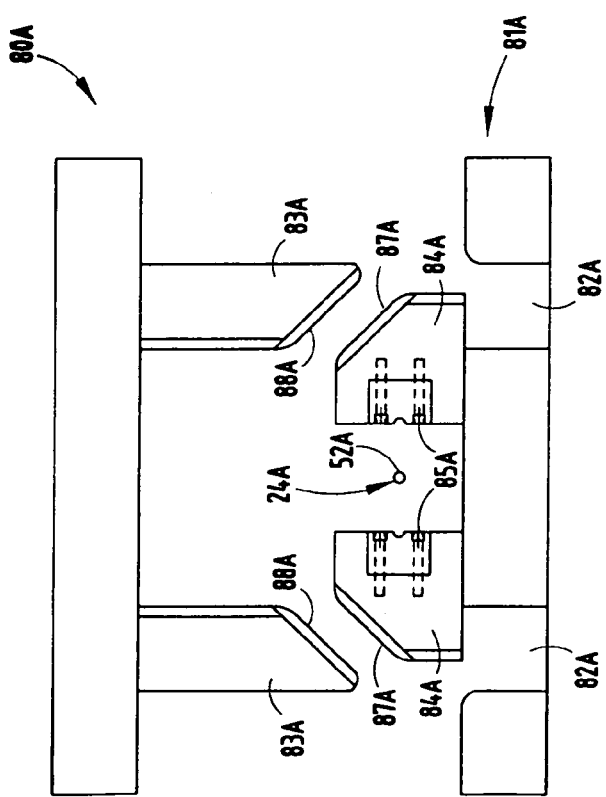

FIGS. 21–22 are schematic side views of a die station for forming the threads 76A on an end of a rod blank opposite a ball section. The illustrated tooling is preferably made from high strength tool steel or ferrotech steel material for long life. The illustrated tooling includes a lower die 80A and an upper die 81A. The lower die 80A includes opening 82A for receiving ends of slide drivers 83A on the upper die 81A. A pair of slides 84A is operably mounted to the lower die 80A for horizontal movement toward each other. The slides 84A each include a forming part 85A adapted to abuttingly engage the end 52A for forming the threads 76A thereon. The slides 84A also have an angled surface 87A that abuts angled surface 88A on the slide drivers 83A. In the open position (FIG. 21), the slides 84A are biased apart, with their angled surfaces 87A positioned under the angled surfaces 88A on the slide drivers 83A. As the upper die 81A moves downward, the angled surface 88A of the slide drivers 83A engage the angled surfaces 87A and drive the slides 84A inwardly. As the upper die 81A further closes downwardly, the ends of the slide drivers 83A fit into the openings 82A where they are supported on their back side.

This provides a very positive and accurate arrangement as the slides 84A engage the blank (24) and form the threads 76A. It is noted that a person of ordinary skill will recognize and be familiar with other details of a die station like FIGS. 21–22, such as the use of return springs for the slide components, bearing shoes, stops, features permitting adjustment, etc.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A method comprising steps of:
   cutting stock to form a rod-shaped blank;
   stamp-forming a ball section on a first end of the blank; and
   stamp-forming an apertured flattened section on a second end of the blank to form a final product.

2. The method defined in claim 1, including a step of axially engaging ends of the blank to accurately form a length dimension of the final product between the ball section and the apertured flattened section.

3. The method defined in claim 2, wherein the step of stamp-forming the ball section includes engaging the first end from at least two orthogonal directions.

4. The method defined in claim 2, wherein the step of stamp-forming the ball section includes engaging the first end vertically to form a rough ball section, rotating the blank 90 degrees about its longitudinal centerline, and engaging the rough ball section vertically a second time.

5. The method defined in claim 2, wherein the step of stamp-forming the ball section includes engaging the first end vertically to form a rough ball section, and then engaging the rough ball section horizontally using cams and slide members to form the final product with the ball section being a net radius shape.

6. The method defined in claim 2, wherein each blank has a length sufficient to manufacture two of the final products.

7. The method defined in claim 6, including a step of separating each blank to form two of the final products.

8. The method defined in claim 1, including providing a transfer die having stations for performing each of the steps of stamp-forming a ball section and stamp-forming an apertured flattened section and having a transfer mechanism for transferring the blank between the stations, and operating the transfer die to form the blank.

9. The method defined in claim 1, including axially engaging ends of the blank to accurately form a length dimension of the blank between the ball section and the hole in the flattened section.

10. The method defined in claim 1, wherein the step of providing stock includes providing at least one rod having opposing flat side surfaces.

11. The method defined in claim 10, wherein the stock includes additional flat side surfaces that are orthogonally related to the first-mentioned opposing flat side surfaces.

12. The method defined in claim 11, wherein the flat side surfaces define a square cross section.

13. The method defined in claim 1, including a step of honing the hole with a honing tool shaped to shave material during translating movement of the honing tool through the hole.

14. The method defined in claim 1, including simultaneously axially striking opposing ends to improve accuracy of a net shape of the ball section, and to improve accuracy of a net shape of the apertured flattened section, and also to improve accuracy of a distance therebetween.

15. The method defined in claim 1, wherein the ball section includes opposing flat surfaces lying inside of a sphere defined by arcuate surfaces of the ball sections.

16. A method comprising steps of:
    cutting the stock to form a rod-shaped blank, the blank having a longitudinal centerline;
    stamp-forming a rough ball section on a first end of the blank;
    rotating the blank on the longitudinal centerline about 90 degrees; and
    stamp-forming the rough ball section to form a final ball section having a net shape with desired radius.

17. The method defined in claim 16, wherein the step of stamp-forming a rough ball section includes forming opposing flat surfaces lying inside of a sphere defined by arcuate surfaces of the ball section.

18. A method comprising steps of:
    cutting the stock to form a rod-shaped blank, the blank having a longitudinal centerline;
    stamp-forming a rough ball section on a first end of the blank by engaging the first end from a first direction; and
    providing cams and slide members, and operating the cams to drive the slide members into the rough ball section from a second direction perpendicular to the first direction to form a final ball section having a net shape with desired radius.

19. The method defined in claim 18, including a step of forming an apertured flattened region at an end opposite the ball section.

20. The method defined in claim 18, including a step of forming a threaded section at an end opposite the ball section, the end opposite the ball section having a square cross section with rounded corners and flat surfaces therebetween, and the threaded section including thread segments formed on the rounded corners and preserving as least part of the flat surfaces between the thread segments.

21. The method defined in claim 18, wherein the step of operating the cams includes leaving opposing flat surfaces on opposite sides of the final ball section.

22. An apparatus comprising:
    a cutter for cutting the stock to form a rod-shaped blank, the blank having a longitudinal centerline;
    at least a first die for stamp-forming a rough ball section on a first end of the blank;
    at least a second die for stamp-forming the rough ball section in a first direction; and
    at least a third die for stamp-forming the rough ball section in a second direction perpendicular from the first direction relative to the rough ball section to form a final ball section having a net shape with desired radius.

23. The apparatus defined in claim 22, including at least a fourth die for axially engaging the first end and an opposite end for shaping the blank to an accurate length.

24. A transfer die apparatus comprising:
    a mechanism for automatically handling and moving a series of rod-shaped blanks;
    at least one first die part for stamp-forming a ball section on a first end of the blank; and
    at least one second die part for stamp-forming an apertured flattened section on a second end of the blank to form a final product.

25. The transfer die apparatus defined in claim 24, wherein the mechanism includes a device for rotating the rod-shaped blanks 90 degrees about an axis defined by the rod-shaped blanks, and the at least one first die part includes first and second die parts at different stations for engaging the ball section.

26. The transfer die apparatus defined in claim 24, wherein the at least one first die part includes a first station with a first set of dies for engaging the first end to form a rough ball section, and a second station with cams and slide members operable to move the slide members into engagement with the rough ball section from a direction different than the first set of dies for forming the rough ball section into a net final ball section.

* * * * *